UNITED STATES PATENT OFFICE 2,585,140

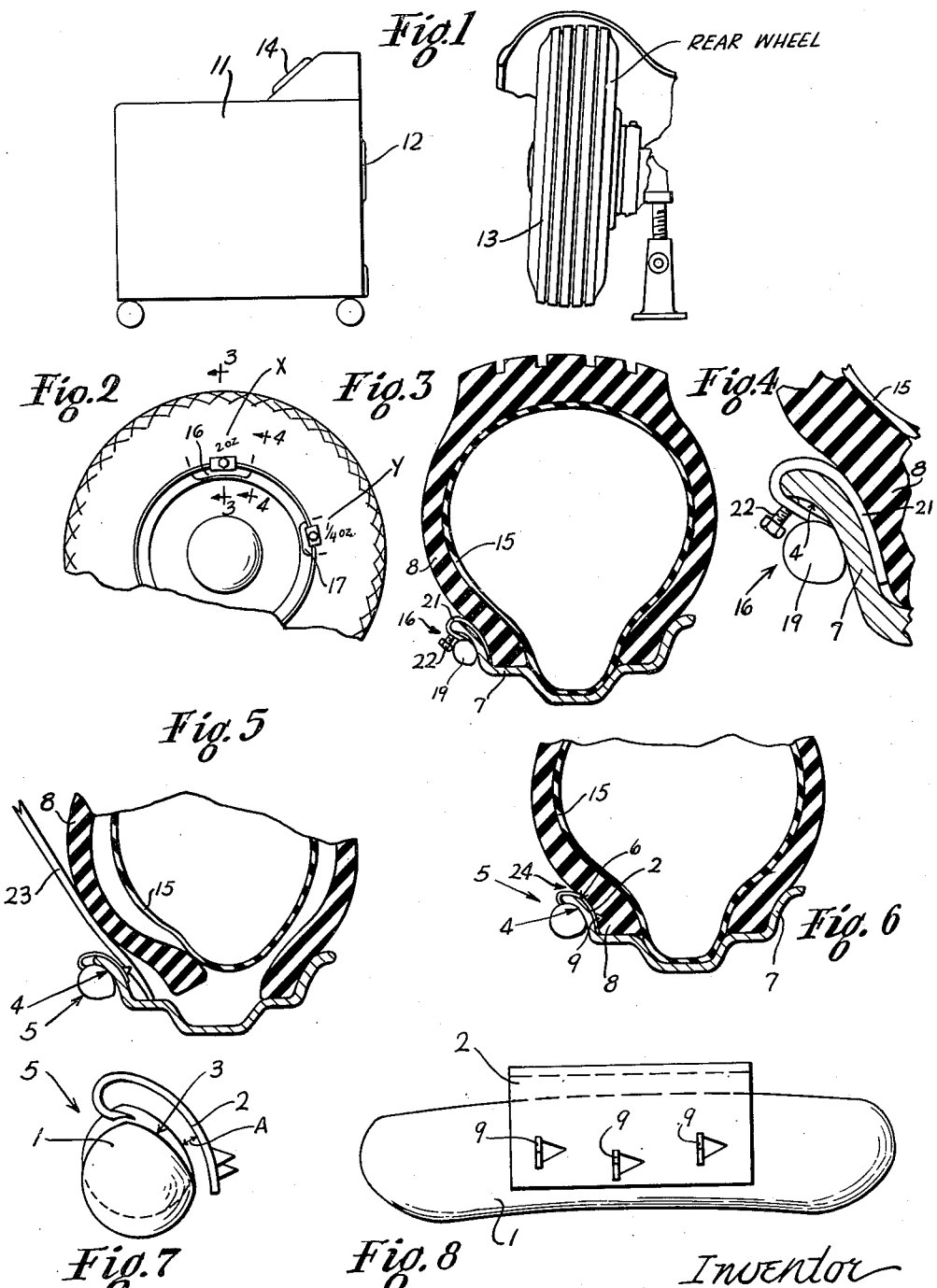

MEANS FOR BALANCING WHEEL-TIRE ASSEMBLIES

Joseph Lencki, Chicago, Ill.

Application August 2, 1946, Serial No. 688,021

3 Claims. (Cl. 301—5)

This invention pertains to an improved balancing weight or lug for a wheel-tire assembly such as conventionally used in passenger automobiles and the like and also pertains to a method for mounting the weight or lug in carrying out the balancing operation of the assembly.

Conventional balancing weights consist of a more or less U-shaped spring clip with a lead weight of variable size on one end, the other end of the clip being smooth and is ordinarily attached to the wheel by fitting it over the edge of the rim and hammering the end of the clip down between the inside of the rim and the tire bead. These conventional weights are thus held in place merely by spring engagement of the clip with the edge of the rim and whatever frictional engagement is available between the tire bead and the clip. The weight is thus held in place in a very casual manner and will not stay in place over a period of time even on ordinary passenger cars driven at reasonably low speeds; and on cars driven at high speeds such as those used in racing and which may be driven at speeds up to 200 miles per hour the balancing weights are easily thrown off under the high centrifugal forces created. A further disadvantage of these conventional balancing weights is found in their tendency to creep or shift one way or another along the rim due to stresses set up in the tire during acceleration or deceleration.

Accordingly, it is the object of the present invention to provide a wheel balancing weight or lug which will not be thrown off by centrifugal force even at the high speeds which are reached in modern automotive racing.

Another object is the provision of a wheel balance weight or lug which will stay in a preselected proper position indefinitely and not shift along the rim due to accelerating and decelerating forces on the tire.

A still further object is the provision of an improved simply constructed wheel balance weight which is readily mounted on and demounted from a wheel of conventional design. In this connection, another object is the provision of a novel method of mounting a balance weight made in accordance with my invention.

I have discovered that one of the reasons for conventional weights being thrown off at high speeds is that centrifugal force on the tire actually increases the tire diameter as much as an inch in some cases, this increase, of course, being accompanied by a decrease in the tire width. This narrowing of the width reduces the frictional hold of the tire bead on the weight, thereby causing it to be thrown off. I have found that the balance weight cannot be thrown off under these conditions if tines or similar means are provided on the weight which actually penetrate or substantially indent the tire bead. Furthermore, I have found that since the bead itself is so tightly engaged with the rim that the bead will not shift along the rim; therefore, by affixing the weight to the bead in this manner the weight will also not shift back and forth along the rim as conventional weights have been found to do.

Other objects and advantages will become apparent from the following description in connection with the drawings in which—

Figure 1 illustrates one form of mechanism for determining the degree and position or positions of unbalance of a tire-wheel assembly while it is on the automobile, the wheel shown being a rear wheel which is raised by a jack and for the test is turned by the automobile motor;

Fig. 2 is a side view of Figure 1 showing master balancing weights in places on the wheel where their necessity has been indicated by the device shown in Figure 1;

Fig. 3 is a sectional view of Fig. 2 on line 3—3 showing the complete tire and wheel rim cross-section;

Fig. 4 is a sectional view of Fig. 2 on line 4—4 showing in enlarged form the details of one of the master balance weights;

Fig. 5 illustrates the insertion of one of the balance weights made in accordance with my invention, when the tire is deflated and the bead is displaced from the rim by a tire iron or like instrument;

Fig. 6 is a view similar to Fig. 5 showing the tire re-inflated after the insertion of the wheel balance weight with the tines on the end of the weight indented securely into the bead of the tire, and Figs. 7 and 8 are end and side views, respectively, much enlarged, of the service balance weight shown in connection with Figs. 5 and 6, which is made in accordance with the present invention.

Referring now in greater detail to the drawings and particularly to Figs. 7 and 8, one form of wheel balance weight or lug which I have herein called a service weight generally designated 5 made in accordance with my invention is shown and it includes a longitudinal weighted portion 1 which, for the sake of minimizing its volume will preferably be made of some dense material such as lead. The weight portion 1 will have attached to it, as for instance, by molding integrally a curved extension 2 which will preferably be made of springy material such as spring steel. Spring material for the member 2 is not absolutely essential for, in some cases, even soft iron may be used. The surface 3 of the weighted portion 1 will preferably be formed so as to fittably engage the outer surface 4 of the flange of the rim 7, as shown in Fig. 6, and the shape of the extension 2 will preferably be substantially that of the inner surface 6 of the wheel rim 7, also as shown in Fig. 6. The major part of the extension 2 will be adapted to be interposed between the entire bead 8 and the rim surface 7 and in accordance with the present invention, tines 9 will be struck from the lower end of the extension 2 and pointed inwardly substantially at right angles to the extension 2 as shown in Fig. 7. It will be observed from Figs. 6 and 7 that the tines are so arranged as to lie in a radial plane through the wheel lying on the axis of the wheel and are substantially at right angles to the adjacent surface of the tire so that they will penetrate or substantially indent the tire bead 8 when the tire is inflated, as shown in Fig. 6. In other words the tines 9 are formed by triangular shaped tabs struck out of the extension and lying in planes perpendicular to the longitudinal axis of the weight and extension as shown in Fig. 6. A single tine 9 will perform satisfactorily in many cases but usually at least two and preferably three will be employed to assure a firm engagement with the tire bead and also to prevent the weight from cocking or twisting. In the usual case, it will also be preferable that the distance A between the extension and the portion 1 will be less than the thickness of the other rim portion 7 so that the lug may be initially held onto the rim by spring engagement.

Figure 1 illustrates one form of mechanism which may be employed to determine the magnitude and position or positions of unbalance of a wheel-tire assembly when it is rotated at high speed. A convenient form of wheel balancing mechanism is that shown in Figure 1 wherein the cabinet 11 is of the type used with the mechanism manufactured by the Stewart-Warner Corporation, Chicago, Illinois, and employs a stroboscopic lamp 12 which directs a stroboscopic light onto the spinning tire 13 and thereby permits the operator to pick out the point or points of unbalance which need the addition of weight to bring the assembly into proper balance condition. The dial 14 of the device 11 also indicates the magnitude of unbalance and permits the operator to determine the exact sizes of weights which need be placed at the positions of unbalance. For purposes of illustration, X and Y in Fig. 2 indicate two such positions of unbalance the location of which have been determined by the stroboscopic light and, furthermore, the dial 14 has determined that a weight of two ounces is necessary at X and the weight of ¼ ounce is necessary at Y to bring the assembly into balance.

Temporary or master weights designated 16 and 17 in Fig. 2 are then applied to the assembly as necessary and the assembly is brought into proper balance by the use of these weights. This manner of balancing the assembly is given by way of example only and any suitable means may be utilized for bringing the assembly into proper balance, many such devices being known to those skilled in the art. Master weight 16 is shown in much enlarged form in Fig. 4 and comprises a weight portion 19 which is similar to the lead weight portion 1 in Fig. 7 and the curved extension 21 which is smooth and may be inserted temporarily between the tire bead 8 and the rim 7. The lock screw 22 is threadedly engaged with the extension 21 and may be forced into engagement with the outer surface 4 of the rim 7 to hold it temporarily in place while the assembly is being brought into proper balance.

When it has been determined definitely that a two ounce weight is required at position X and a ¼ ounce weight is required at position Y, the assembly is properly marked to indicate the amount and location of the weights, preferably by marking directly on the tire the amount of the weight and its location as indicated at X and Y, the lock screws 22 will be released and the temporary or master weights 16 and 17 will be removed. The air will be released from the tube 15 to deflate the tire and the tire bead 8 will be displaced from the rim by using a tire iron or similar tool 23, as shown in Fig. 5. Service lugs in accordance with the present invention, as shown in Figs. 7 and 8 and having the proper weights thus indicated on the tire will then be inserted at positions X and Y, as indicated by the position markings previously applied to the tire. The tire iron 23 will be removed and the tube 15 re-inflated as shown in Fig. 6, thereby forcing the bead 8 outwardly against the extensions 2 of the weights 5 and will cause the tines 9 to penetrate the outer surface of the bead 8 to hold the lugs permanently in position.

Thus, it will be apparent with my improved construction the lugs are locked in position by interengagement with the tire and cannot slide off the rim in response to centrifugal action as in the case of the lugs of prior art construction. The lugs are cheap in price and no expensive operations are required in their manufacture so that they reach the user at no substantial increase in price. Furthermore, it will be noted that even if the portion of the tire side wall at 24 (Fig. 6) is substantially reduced in width when the tire is rotating at high speed and the frictional engagement of the bead and side wall portion at 24 with the extension 2 is substantially decreased, the lugs 5 will still remain in their proper positions due to the interlocking engagement with the tines 9. Furthermore, in spite of slight shifting of the side wall portion at 24 with respect to the rim 7 when the tire is accelerated or decelerated, this will be ineffective to cause shifting of the lug along the rim for it will be firmly anchored in the bead 8 which remains firmly positioned through its complete circumferential frictional engagement with the rim.

While a particular form of the present invention has been shown it will be apparent that minor changes therein will readily suggest themselves to others skilled in the art without departing from the spirit and scope of the invention.

Having thus described the invention what is claimed as new is:

1. A balancing device for a wheel and tire assembly in which the bead of the tire normally abuts against the inner surface of an edge of a rim, said balancing device comprising a weight shaped to be engageable with the outer surface of the edge of the rim, an extension attached to said weight and having a portion in spaced relation therewith and shaped to be in contiguous relation with the inner surface of the edge of the rim, said portion shaped to extend between the edge of the rim and the bead to clip the weight to the rim, and a tine on said portion of said extension facing in a direction away from the weight and disposed at substantially right angles to the surface of said portion of the extension and the corresponding outer surface of the bead of the tire, said tine being substantially disposed in a plane extending radially from the axis of the wheel and being shaped to penetrate said bead to positively maintain said weight in fixed relation with said wheel and tire at high speeds of operation of said wheel and tire assembly.

2. A balancing device for a wheel and tire assembly in which the bead of the tire, when the latter is inflated, normally abuts against the inner surface of an edge of a rim, said device comprising a weight shaped to be engageable with the outer surface of the edge of the rim, a resilient extension having one end molded in said weight and having the opposite end in spaced relation to the weight and shaped to be in contiguous relation with the inner surface of the edge of the rim and to be disposed between the rim and the bead, said opposite end of the extension being spaced from the weight a greater distance than the thickness of the edge of the rim, to define a clip for securing the weight on the rim and a plurality of tines projecting outwardly from the opposite end of the extension and facing in a direction away from the weight, said tines being disposed at substantially right angles to the surface of said opposite end of the extension and the corresponding outer surface of the bead of the tire and extending respectively in spaced planes passing radially outward from the axis of the wheel, said tines being shaped to penetrate said bead when said tire is inflated to positively maintain said weight in fixed relation with said wheel and tire for all service speed conditions of said wheel and tire assembly.

3. A balancing device for a wheel and tire assembly in which the bead of the tire, when the latter is inflated, normally abuts against the inner surface of an edge of a rim, said device comprising a weight shaped to be engageable with the outer surface of the edge of the rim, a resilient extension having one end molded in said weight and having the opposite end in spaced relation to the weight and shaped to be in contiguous relation with the inner surface of the edge of the rim and to be disposed between the rim and the bead, said opposite end of the extension being spaced from the weight a greater distance than the thickness of the edge of the rim to define a clip for securing the weight on the rim, and a plurality of triangular shaped pointed tabs projecting outwardly from the opposite end of the extension and facing in a direction away from the weight to define tines, said tabs lying in spaced planes extending substantially at right angles to the surface of said opposite end of the extension and the corresponding outer surface of the bead of the tire and extending radially outward from the axis of the wheel, said tabs being shaped to penetrate said bead when said tire is inflated to positively maintain said weight in fixed relation with said wheel and tire for all service speed conditions of said wheel and tire assembly.

JOSEPH LENCKI.

REFERENCES CITED

The following references are of record in the file of this patent:

UNITED STATES PATENTS

| Number | Name | Date |
| --- | --- | --- |
| 2,049,918 | Marsh | Aug. 4, 1936 |
| 2,137,416 | Rubsam | Nov. 22, 1938 |
| 2,195,473 | Von Brethurst | Apr. 2, 1940 |
| 2,202,129 | Turner | May 28, 1940 |
| 2,258,011 | Inman | Oct. 7, 1941 |
| 2,313,339 | Hare | Mar. 9, 1943 |